US012632288B2

(12) United States Patent
Yuan et al.

(10) Patent No.: US 12,632,288 B2
(45) Date of Patent: *May 19, 2026

(54) MANAGING EXECUTION OF DATA PROCESSING JOBS IN A VIRTUAL COMPUTING ENVIRONMENT

(71) Applicant: Capital One Services, LLC, McLean, VA (US)

(72) Inventors: Ming Yuan, Buffalo Grove, IL (US); Vijayalakshmi Veeraraghavan, Palatine, IL (US); Preet Kamal Bawa, Palatine, IL (US); Lance Creath, Chicago, IL (US); Alec Fekete, Naperville, IL (US)

(73) Assignee: Capital One Services, LLC, McLean, VA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/194,776

(22) Filed: Apr. 3, 2023

(65) Prior Publication Data
US 2023/0315511 A1 Oct. 5, 2023

Related U.S. Application Data

(63) Continuation of application No. 16/841,896, filed on Apr. 7, 2020, now Pat. No. 11,620,155, which is a
(Continued)

(51) Int. Cl.
*G06F 9/48* (2006.01)
*G06F 21/44* (2013.01)

(52) U.S. Cl.
CPC .......... *G06F 9/4818* (2013.01); *G06F 9/4887* (2013.01); *G06F 21/44* (2013.01)

(58) Field of Classification Search
CPC ....... H04L 67/1004–1029; H04L 67/01; G06F 9/45533–52
See application file for complete search history.

(56) References Cited

U.S. PATENT DOCUMENTS

| | | |
|---|---|---|
| 5,889,989 A | 3/1999 | Robertazzi et al. |
| 7,509,671 B1 | 3/2009 | Bedell et al. |
| | (Continued) | |

OTHER PUBLICATIONS

Towards a Realistic Scheduler for Mixed Workloads with Workflows Alexey Ilyushkin and Dick Epema (Year: 2015).*
(Continued)

*Primary Examiner* — April Y Blair
*Assistant Examiner* — Paul V Mills
(74) *Attorney, Agent, or Firm* — Harrity & Harrity, LLP

(57) ABSTRACT

A device may receive a job request associated with a data processing job, including job timing data specifying a time at which the data processing job is to be executed by a virtual computing environment. The device may receive user data associated with the job request and validate the data processing job based on the user data. In addition, the device may identify a priority associated with the data processing job, based on the user data and the job timing data. The device may provide, to a job queue, job data that corresponds to the data processing job, and monitor the virtual computing environment to determine when virtual resources are available. The device may also determine, based on the monitoring, that a virtual resource is available and, based on the determination and the priority, provide the virtual resource with data that causes execution of the data processing job.

20 Claims, 4 Drawing Sheets

Related U.S. Application Data continuation of application No. 16/004,172, filed on Jun. 8, 2018, now Pat. No. 10,620,989.

(56) References Cited

U.S. PATENT DOCUMENTS

| | | | |
|---|---|---|---|
| 7,743,378 B1 | 6/2010 | Markov | |
| 8,489,872 B1 | 7/2013 | Kapoor | |
| 8,612,990 B1 | 12/2013 | Greenfield et al. | |
| 10,365,964 B1 | 7/2019 | Subburasu | |
| 10,474,497 B1 | 11/2019 | Kancharla | |
| 10,620,989 B2 | 4/2020 | Yuan et al. | |
| 10,884,787 B1 | 1/2021 | Wagner et al. | |
| 11,620,155 B2 | 4/2023 | Yuan et al. | |
| 2002/0078117 A1 | 6/2002 | Wang et al. | |
| 2003/0014521 A1 | 1/2003 | Elson et al. | |
| 2004/0015968 A1 | 1/2004 | Neiman et al. | |
| 2004/0044718 A1 | 3/2004 | Ferstl et al. | |
| 2005/0114860 A1 | 5/2005 | Lin et al. | |
| 2006/0168584 A1 | 7/2006 | Dawson et al. | |
| 2007/0110094 A1 | 5/2007 | Tobita et al. | |
| 2008/0066070 A1 | 3/2008 | Markov | |
| 2008/0235065 A1 | 9/2008 | Dan et al. | |
| 2009/0119673 A1 | 5/2009 | Bubba | |
| 2010/0223618 A1 | 9/2010 | Fu et al. | |
| 2010/0281166 A1 | 11/2010 | Buyya et al. | |
| 2010/0333109 A1* | 12/2010 | Milnor | G06F 9/4881 |
| | | | 718/106 |
| 2011/0154350 A1 | 6/2011 | Doyle et al. | |
| 2011/0173626 A1 | 7/2011 | Chi et al. | |
| 2012/0030683 A1* | 2/2012 | Kurdi | G06F 9/5072 |
| | | | 718/104 |
| 2012/0167101 A1 | 6/2012 | Kandula et al. | |
| 2013/0104140 A1 | 4/2013 | Meng et al. | |
| 2013/0179894 A1 | 7/2013 | Calder et al. | |
| 2013/0179895 A1 | 7/2013 | Calder et al. | |
| 2013/0191843 A1 | 7/2013 | Sarkar et al. | |
| 2013/0238785 A1 | 9/2013 | Hawk et al. | |
| 2013/0326537 A1* | 12/2013 | Edelstein | G06F 9/546 |
| | | | 718/106 |
| 2014/0033212 A1 | 1/2014 | Balasubramaniam et al. | |
| 2014/0068617 A1* | 3/2014 | Rachakonda | G06F 9/4843 |
| | | | 718/101 |
| 2014/0075032 A1 | 3/2014 | Vasudevan et al. | |
| 2014/0101673 A1 | 4/2014 | Klyuchevskyy et al. | |
| 2014/0366037 A1 | 12/2014 | Berretta et al. | |
| 2015/0150016 A1 | 5/2015 | Kim | |
| 2015/0363229 A1 | 12/2015 | Wang | |
| 2016/0162331 A1 | 6/2016 | Geng et al. | |
| 2016/0182397 A1 | 6/2016 | Mcfarlin et al. | |
| 2017/0116038 A1 | 4/2017 | Netto et al. | |
| 2017/0126795 A1 | 5/2017 | Kumar et al. | |
| 2017/0139745 A1* | 5/2017 | Scheuer | G06F 9/4881 |
| 2017/0235605 A1 | 8/2017 | Chaloupka et al. | |
| 2019/0163526 A1 | 5/2019 | Brillante et al. | |
| 2019/0250958 A1 | 8/2019 | Kumar et al. | |

OTHER PUBLICATIONS

MATRIX: MAny-Task computing execution fabRIc at exascale Ke Wang, Anupam Rajendran, loan Raicu (Year: 2013).*

Grouping and deploying fine-grained tasks on grid by learning performance data Nithiapidary Muthuvelu PhD thesis, Multimedia University; p. vi, 6, 16, 54, 149-150 (Year: 2011).*

Applying Advance Reservation to Increase Predictability of Workflow Execution on the Grid Marek Wieczorek, Mumtaz Siddiqui, Alex Villazon, Radu Prodan, Thomas Fahringer (Year: 2006).*

An Advance Reservation Mechanism to Enhance Throughput in an Opportunistic High Performance Computing Environment Eliza Gomes and M.A.R. Dantas (Year: 2014).*

GarQ: An Efficient Scheduling Data Structure for Advance Reservations of Grid Resources Anthony Sulistio, Uros Cibej, Sushil K. Prasad, and Rajkumar Buyya (Year: 2009).*

Benkner S., et al., "A Generic QoS Infrastructure for Grid Web Services," Advanced International Conference on Telecommunications and International Conference on Internet and Web Applications and Services, 2006, 6 pages.

Buyya R., et al., "Market-oriented Grid and Utility Computing," Chapters 5, 14, and 190, 2010.

Cao J., et al., "Queue Scheduling and Advance Reservations with Cosy," IEEE 18th International Parallel and Distributed Processing Symposium, Apr. 2004, pp. 63-70.

Fahringer T., et al., "Askalon: A Grid Application Development and Computing Environment," The 6th IEEE/ACM International Workshop on Grid Computing, Seattle, WA, USA, Nov. 2005, pp. 122-131.

Mastelic T., et al., "Predicting Resource Allocation and Costs for Business Processes in the Cloud," 2015 IEEE World Congress on Services, 2015, pp. 47-54.

Nurmi D., et al., "VARQ; Virtual Advance Reservations for Queues," Proceedings of the 17th International Symposium on High-Performance Distributed Computing (HPDC-17 2008), Boston, MA, USA, Jun. 2008, pp. 75-86.

Omezzine A., et al., "Negotiation Based Scheduling for an Efficient SaaS Provisioning in the Cloud," 2016 IEEE 4th International Conference on Future Internet of Things and Cloud (FiCloud), Vienna, Austria, Aug. 2016, pp. 33-40.

Sakellariou. R., et al., "Scheduling Workflows with Budget Constraints," Integrated Research in GRID Computing, 2007, pp. 189-202.

Shi J., et al., "Elastic Resource provisioning for Scientific Workflow Scheduling in Cloud Under Budget and Deadline Constraints," Cluster Computing, Jan. 2016, vol. 19, pp. 167-182.

Stein S., et al., "Robust Execution of Service Workflows Using Redundancy and Advance Reservations," IEEE Transactions on Services Computing, vol. 4 (2), Apr.-Jun. 2011, pp. 125-139.

Wang K., et al., "MATRIX: MAny-Task computing execution fabRic at exascale." 2013, 12 pages.

Wieczorek M., et al., "Applying Advance Reservation to Increase Predictability of Workflow Execution on the Grid," 2006 Second IEEE International Conference on e-Science and Grid Computing (e-Science'06), Amsterdam, Netherlands, Dec. 2006, 8 pages.

Zeng L., et al., "QoS-Aware Middleware for Web Services Composition," IEEE Transactions on Software Engineering, May 2004, vol. 30 (5), pp. 311-327.

* cited by examiner

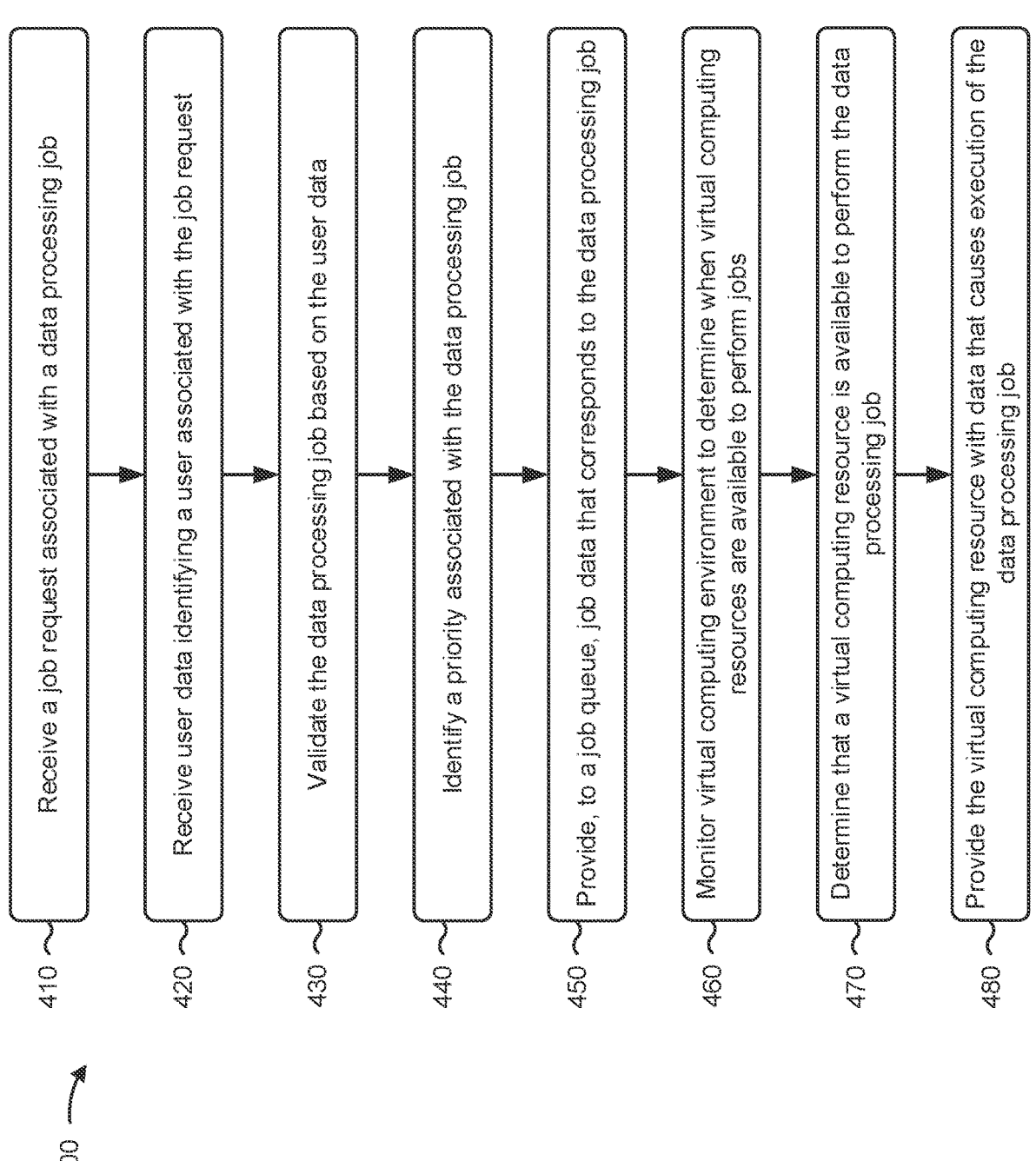

410 — Receive a job request associated with a data processing job

420 — Receive user data identifying a user associated with the job request

430 — Validate the data processing job based on the user data

440 — Identify a priority associated with the data processing job

450 — Provide, to a job queue, job data that corresponds to the data processing job 460 — Monitor virtual computing environment to determine when virtual computing resources are available to perform jobs 470 — Determine that a virtual computing resource is available to perform the data processing job 480 — Provide the virtual computing resource with data that causes execution of the data processing job

MANAGING EXECUTION OF DATA PROCESSING JOBS IN A VIRTUAL COMPUTING ENVIRONMENT

RELATED APPLICATION

This application is a continuation of U.S. patent application Ser. No. 16/841,896, filed Apr. 7, 2020 (now U.S. Pat. No. 11,620,155), which is a continuation of U.S. patent application Ser. No. 16/004,172, filed Jun. 8, 2018 (now U.S. Pat. No. 10,620,989), each of which are incorporated herein by reference.

BACKGROUND

A virtual computing environment provides the functionality of a physical computer, e.g., using emulation of hardware and software that might be included in a physical computer. Virtual computing environments, including cloud computing environments, may make use of virtual machines (e.g., a virtual representation of a physical computer) to perform a variety of functions.

SUMMARY

According to some implementations, a method may comprise: receiving, by a device, a job request associated with a data processing job, the job request including job timing data specifying a time at which the data processing job is to be executed by a virtual computing environment; receiving, by the device, user data identifying a user associated with the job request; validating, by the device, the data processing job based on the user data; identifying, by the device, a priority associated with the data processing job, the priority being based on the user data and the job timing data; providing, by the device and to a job queue of a plurality of job queues, job data that corresponds to the data processing job; monitoring, by the device, the virtual computing environment to determine when virtual computing resources are available to perform jobs; determining, by the device and based on the monitoring, that a virtual computing resource included in the virtual computing environment is available to perform the data processing job; and providing, by the device and based on the determination that the virtual computing resource is available and based on the priority associated with the data processing job, the virtual computing resource with data that causes execution of the data processing job.

According to some implementations, a device may comprise: one or more memories; and one or more processors, communicatively coupled to the one or more memories, to: receive a job request associated with a data processing job, the job request including job timing data specifying a time at which the data processing job is to be executed by a cloud computing environment; receive user data identifying a user associated with the job request; determine a priority associated with the data processing job, the priority being based on the user data, the job timing data, and one or more dependencies associated with the data processing job; provide, to a job queue of a plurality of job queues, job data that corresponds to the data processing job; determine that the one or more dependencies associated with the data processing job have been satisfied; and provide, based on the determination that the one or more dependencies have been satisfied and based on the priority associated with the data processing job, the cloud computing resource with data that causes execution of the data processing job.

According to some implementations, a non-transitory computer-readable medium may store instructions, the instructions comprising: one or more instructions that, when executed by one or more processors, cause the one or more processors to: provide, to a user device, data that causes presentation, at the user device, of a user interface for receiving a job request, the user interface including one or more fields for: data identifying a job to be executed by a virtual computing environment, data identifying a user associated with the user device, and data identifying job timing data; receive, from the user device and based on the user interface, the job request, the job request being associated with: a data processing job, a user identifier, and job timing data; validate the data processing job based on the user identifier; identify a measure of priority associated with the data processing job, the measure of priority being based on the user identifier and the job timing data; monitor the virtual computing environment to determine that a virtual computing resource of the virtual computing environment is available to perform the data processing job; and provide, based on the determination that the virtual computing resource is available and based on the measure of priority associated with the data processing job, the virtual computing resource with data that causes execution of the data processing job.

BRIEF DESCRIPTION OF THE DRAWINGS

FIG. 4 is a flow chart of an example process for managing execution of data processing jobs in a virtual computing environment.

DETAILED DESCRIPTION

Figure 1:
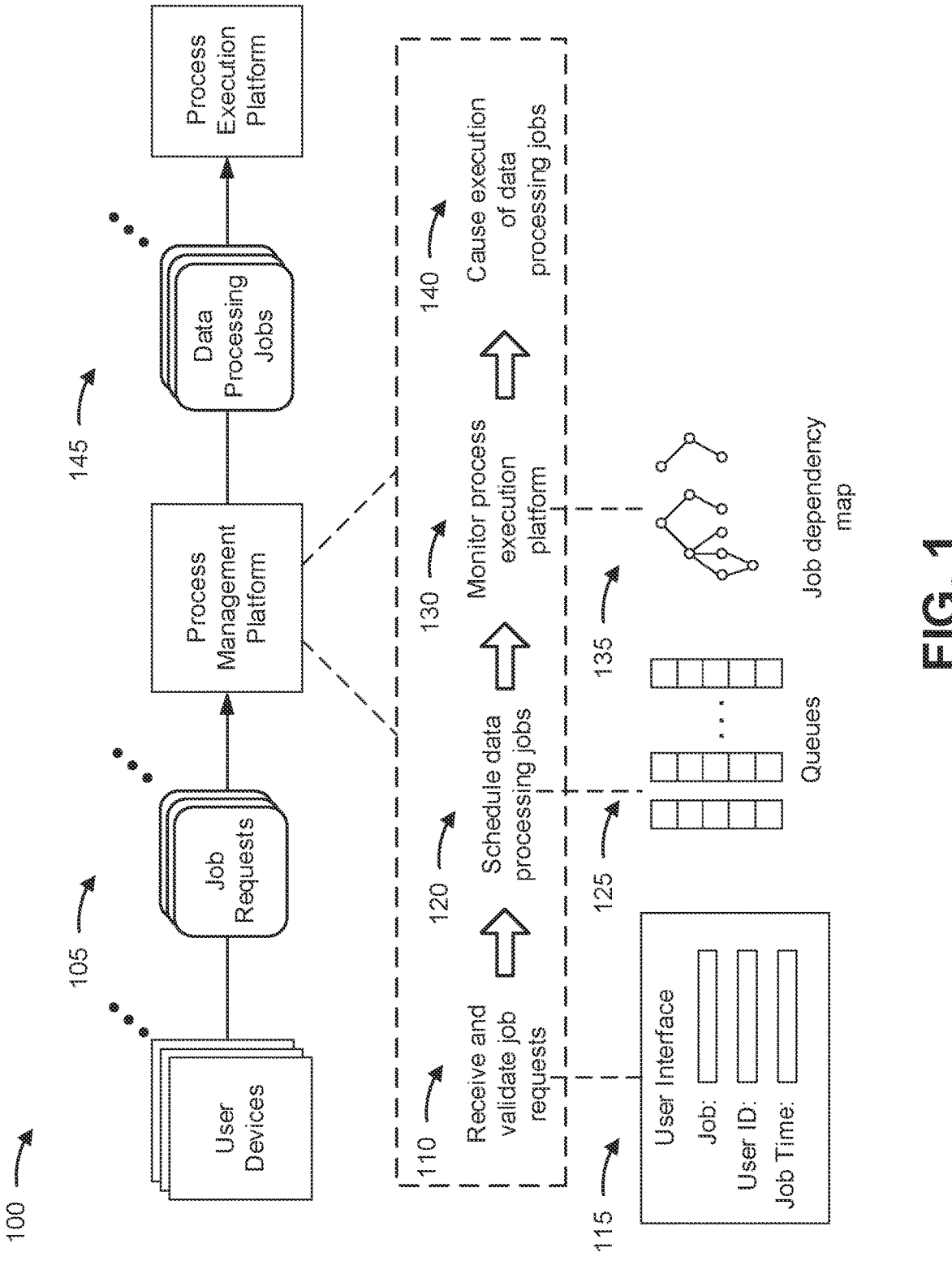
FIG. 1 is a diagram of an overview of an example implementation described herein.

The following detailed description of example implementations refers to the accompanying drawings. The same reference numbers in different drawings may identify the same or similar elements.

Virtual computing environments are often used to perform data processing jobs for a variety of entities, including individuals, corporations, governments, and/or the like. The data processing jobs capable of being performed using a virtual computing environment may vary, and are often performed using a cloud computing environment to take advantage of a relatively large pool of computing resources. While the use of a virtual computing environment may enable users to take advantage of numerous computing resources to perform data processing jobs, it may be difficult for an organization making use of a virtual computing environment to appropriately schedule data processing jobs with different computational requirements, dependencies, permissions, and/or the like.

Some implementations, described herein, provide a process management platform that enables an entity to manage data processing jobs that are to be performed by a virtual computing environment, e.g., in a manner designed to account for various differences in data processing job resource requirements, dependencies, permissions, and/or the like. For example, the process management platform may receive a job request associated with user data and job timing information specifying when the data processing job should be completed. The process management platform may take a variety of actions designed to cause execution of the data processing job by the specified time. For example, the process management platform may validate the data processing job, e.g., in a manner designed to verify that the entity (e.g., user, application, and/or the like) requesting execution of the data processing job has appropriate permissions. The process management platform may also identify a priority for the data processing job, e.g., in a manner designed to determine an order of execution for the data processing job relevant to other data processing jobs that were requested. In addition, the process management platform may make use of one or more job queues and virtual computing environment monitoring methods to determine when a virtual computing resource capable of performing the data processing job is available, and when the data processing job is due for execution. Using the foregoing information, alone or in addition to other information available or derived for the data processing job, the process management platform may cause execution of the data processing job. When implemented on a large scale, the process management platform may manage execution of data processing jobs for many hundred, thousands, millions, etc. of users.

In this way, the process management platform enables an entity (e.g., an entity in control of the process management platform) to manage the manner in which data processing jobs are scheduled and executed by a virtual computing environment. For example, an organization that uses virtual computing resources for performing data processing jobs may use the process management platform in a manner designed to ensure that permissions associated with various jobs are being enforced, dependencies between data processing jobs and/or virtual computing resources are being satisfied, data processing jobs are being completed on time, virtual computing environment resources are being efficiently used, and/or the like. In some implementations, the process management platform may provide a user interface enabling job requests to be submitted by a large variety of users that might not otherwise be capable of submitting job requests. Using the process management platform may also result in significant conservation of computing resources, such as the computing resources used by users to submit job requests and computing resources used by the virtual computing environment to perform the data processing jobs. For example, computing resources used to submit jobs may be conserved by providing a user interface for guiding input for job requests (e.g., reducing erroneous or otherwise improper job requests) and by performing validation (e.g., to reduce time and/or computational resources that might otherwise be used to validate data processing jobs). Computing resources used by the virtual computing environment may be conserved by using data processing job priority, job dependency information, and/or other information, in a manner designed to schedule data processing job execution efficiently, minimizing unnecessary downtime, data storage, spooling, dependency locks, and/or the like.

FIG. 1 is a diagram of an overview of an example implementation 100 described herein. As shown in FIG. 1, example implementation 100 includes user devices (e.g., a personal computer, mobile phone, server computer, and/or the like), a process management platform (e.g., a server computer, cloud computing platform, and/or the like), and a process execution platform (e.g., a server computer, cloud computing platform, and/or the like). While depicted separately in implementation 100, in some implementations, process management platform and process execution platform may be implemented in a single platform (e.g., a single device, single cloud computing platform, and/or the like). Some or all of the devices and/or platforms describe in implementation 100 may be implemented in a single network of computing devices, such as an enterprise network controlled and/or managed by an entity, such as a corporation or other organization. In particular, the use of process management platform to manage data processing jobs within an enterprise network may enable an entity to exert significant controls over the data processing jobs and the virtual hardware resources used to perform the data processing jobs.

As shown by reference number 105, user devices provide job requests to the process management platform. Each job request may include data defining a data processing job to be performed, by the process execution platform, on behalf of a user associated with one of the user devices. A job request may include other information, such as job timing data that specifies a time at which and/or by which the data processing job is to be executed. Dependency data may also be included in the job request, which may specify one or more dependencies, described in further detail below, of the data processing job (e.g., other jobs upon which the data processing job depends, input data that the data processing job requires as input, a maximum cost associated with performing the data processing job, and/or the like). The job requests may be received in a variety of formats (e.g., JavaScript Object Notation (JSON) file or input, Extensible Markup Language (XML) file or input, an application specific format, and/or the like) and through a variety of channels (e.g., via a user interface, via direct user input using a peripheral device, via a local or wide area network, via file server, via a console application, via an data processing job specific application, and/or the like).

As shown by reference number 110, the process management platform receives and validates the job requests. For example, the process management platform may validate the format of the job request, the data processing job specified by the job request, and/or the user associated with the job request. The format of the job request may be validated, for example, by determining whether the job request is in a format readable by the process management platform, determining whether the job request includes all of the information needed by the process management platform to cause execution of the data processing job specified in the job request, and/or the like. The data processing job may be validated, for example, by determining whether the instructions to execute the data processing job are available to the process execution platform, determining whether any dependencies associated with the data processing job are satisfied or will be satisfied, determining whether the job is capable of being completed by the time specified in the timing data (e.g., based on data dependencies and/or other data processing job dependencies), and/or the like. The user associated with the job request may be validated, for example, by using a user identifier associated with the job request to determine whether the user is authorized to execute the data processing job (e.g., including determining whether the user is authorized to use the data processing operations of the data processing job, authorized to use the input data for the data processing operations of the data processing job, authorized to consume an amount of computing resources associated with performance of the data processing job, and/or the like). In some implementations, the user identifier may be an application identifier, e.g., identifying an application that is associated with the job request.

In some implementation, the process management platform may obtain a job profile associated with a data processing job. The job profile may include information useable by the process management platform to facilitate validation and/or execution of the data processing job. The job profile may include, for example, information identifying job resources that are needed to execute the data processing job (including estimated job resources); job permissions specifying user identifiers, user roles, application identifiers, job request sources, and/or the like, which are permitted to cause execution of the data processing job; a measure of job priority that may indicate, relative to other data processing jobs, the importance of performing the data processing job; a set of job dependencies that may identify data requirements associated with the data processing job (e.g., input data needed to perform the data processing job) and/or other data processing jobs that are pre-requisites to performing the data processing job; and/or other information usable by the process management platform to facilitate validation and/or execution of the data processing job.

In a situation where a job request is not validated, the process management platform may notify the user associated with the job request. In some implementations, additional action(s) may be taken in response to a job request not being validated, and the action(s) may depend on the reason for the validation failure. For example, in a situation where the user is not authorized to cause a data processing job to be performed, the user device associated with the user may be notified, along with a predetermined entity associated with the data processing job (e.g., a computing device associated with a manager of the user, a computer security device, and/or the like). In a situation where the job timing data does not provide sufficient time to perform the data processing job, the process management platform may send a notification to the user device associated with the user, which may include a suggested time to use for job timing data (e.g., a suggested time based on the process management platform data processing schedule, described in further detail below). The ability to validate job requests and data processing jobs may help conserve computing resources by solving validation problems as job requests are received, and providing users with the ability to correct validation issues as soon as validation issues are detected. Validation may also facilitate data processing job scheduling, by ensuring that the process management platform does not waste computing resources scheduling and/or attempting to perform data processing jobs that are not validated.

As shown by reference number 115, and as noted, above, the process management platform may use a user interface to receive job requests. The user interface may include input fields, such as a job identifier input field used to identify the data processing job, a user identifier field used to identify the user requesting the data processing job, and a job time field used to provide job timing data that specifies when the data processing job should be executed and/or completed. Other data may also be provided via the user interface, such as a location of input data to be used in performing the data processing job, dependencies associated with the data processing job, a target or maximum cost (e.g., in currency and/or computing resources) to be used in performing the data processing job, virtual resources to be used to execute the data processing job, and/or the like. The user interface may, in some implementations, also be used for providing output to users associated with user devices, such as validation results, data processing job performance results, data processing job status updates, and/or the like.

As shown by reference number 120, the process management platform may schedule data processing jobs based on the job requests. For example, the process management platform may provide or store validated data processing jobs in one or more data structures, such as in one or more queues. In some implementations, as shown by reference number 125, the process management platform may use one or more queues (e.g., priority queues) to schedule the data processing jobs.

By way of example, for each data processing job managed by the process management platform, the process management platform may store job data associated with the data processing job in a priority queue along with a corresponding measure of priority. In some implementations, the measure of priority is relative, such as a rank that ranks the priority of a data processing job relative to other data processing jobs stored in one or more queues. In some implementations, the measure of priority is calculated based on various characteristics associated with the corresponding data processing job, such as the time the data processing job is to be executed and/or finished, dependencies of the data processing job, including data availability dependencies and/or pre-requisite job dependencies. Additionally, or alternatively, the measure of priority may be based on a default measure of priority associated with the particular data processing job, the user that requested the data processing job, or the amount of time job data for the data processing job has been stored in a queue. In some implementations, the process management platform may update measures of priority for one or more data processing jobs, e.g., based on data processing jobs being finished, canceled, escalated, and/or the like.

In some implementations, job priority may specify an outcome to prioritize for the corresponding data processing job. For example, job priority for the data processing job may specify time as a priority, in which case the process management platform may schedule the data processing job in a manner designed to prioritize executing the data processing job quickly. As another example, job priority for the data processing job may specify low resource usage, or cost, as a priority, in which case the process management platform may schedule the data processing job in a manner designed to minimize resource usage and/or resource costs (e.g., by scheduling the data processing jobs during non-peak times, using a minimum amount of resources required to perform the data processing job, and/or the like.

In some implementations, a single queue, array, list, and/or the like may be used to store job data for data processing jobs that are to be executed by the process execution platform. In some implementations, multiple queues, arrays, lists, and/or the like, may be used. In a situation where multiple data structures, (e.g., multiple priority queues) are used by the process management platform, the multiple data structures may be differentiated in a variety of ways, such as differentiating data structures by measures of priority (e.g., each data structure stores jobs with a particular measure or range of priority), data processing job type (e.g., different data processing operations may be in different queues), data processing job dependencies (e.g., one data structure for data processing jobs without dependencies, and one or more other data structures for data processing jobs with dependencies), virtual computing resources used to execute the data processing jobs (e.g., one data structure for each distinct virtual computing resource), users associated with data processing jobs (e.g., a data structure for particular users and/or types of users), and/or the like. In some implementations, the process management platform may move job data for a data processing job from one data structure to another, e.g., from one priority queue to another based on a change in the data processing job dependencies.

In some implementations, the process management platform may schedule data processing jobs based on dependencies, or constraints, which are associated with the virtual hardware resources and/or the process execution platform. For example, an organization may wish to use the process management platform to configure and satisfy platform-based dependencies, or constraints (e.g., cloud computing configuration dependencies), such as a platform availability dependency setting particular windows for data processing job execution (e.g., no data processing jobs after 9 p.m., no data processing jobs between 9 a.m. and 5 p.m., and/or the like), setting virtual hardware resource cost restrictions (e.g., only particular data processing jobs are permitted to consume a particular amount of virtual memory, no single data processing job is permitted to make use of all available virtual hardware resources, every data processing job has a maximum virtual processor allotment, and/or the like), setting currency cost restrictions (e.g., in a situation where use of the process execution platform to perform data processing jobs incurs a financial cost, limits may be used, such as a limit placed on how much a single data processing job may cost, a total cost limit over a predetermined period of time, a cost per minute or cost per hour limit, and/or the like), setting restrictions at certain time periods (e.g., a block of time for process execution platform maintenance where a reduced amount of virtual hardware resource, or no virtual hardware resources, may be used to perform data processing jobs), and/or the like. Using various platform-based dependencies, or constraints, such as those described above, the process management platform may provide an entity with enhanced scheduling of and control over the performance of data processing jobs.

While various scheduling and queueing implementations are described above, other scheduling and/or queuing implementations may be used. In other words, the scheduling implementation used by the process management platform may vary, and the queuing implementation may vary, and the scheduling output may be formatted in a manner designed to work as input for the queuing implementation, enabling a variety of different implementations to be used.

As shown by reference number 130, the process management platform monitors the process execution platform, which may include monitoring virtual computing resources used to perform data processing jobs. As noted above, the process execution platform executes data processing jobs. For example, the process execution platform may include one or more virtual machines operating in a cloud configuration, on the premises of the process management platform, or in a combination of cloud and on premise virtual machines. The process management platform may monitor the process execution platform in a variety of ways. In some implementations, the process management platform may include one or more virtual hardware monitoring applications that provide a variety of information regarding virtual machines, such as information identifying the underlying computer hardware resources allocated to and used by the virtual machine, information identifying processes being performed by the virtual machine, and/or the like. In some implementations, one or more other devices and/or applications may provide the process management platform with data indicating the status of one or more virtual machines and/or data processing jobs, such as one or more devices and/or applications included in the process execution platform. By monitoring the process execution platform, the process management platform is able to identify which data processing jobs are being executed by which virtual and/or physical resources. The process management platform is also able to determine, based on the monitoring, when data processing jobs have been completed, which may enable the process management platform to determine when virtual resources may be freed and additional data processing jobs may be executed.

In some implementations, as shown by reference number 135, the process management platform may use a job dependency map while monitoring the process execution platform. The job dependency map is a data structure that includes data defining the dependencies associated with data processing jobs. In some implementations, the job dependency map may define dependencies for all data processing jobs for which the process management platform is aware of the dependencies, whether the data processing jobs are scheduled for execution or not. In some implementations, the job dependency map may define dependencies for data processing jobs scheduled by the process management platform. By way of example, the job dependency map may specify, for a particular data processing job, which data processing jobs are pre-requisites (e.g., to be complete prior to execution to the particular data processing job), and which other data processing jobs depend upon the particular data processing job. In some implementations, the job dependency map may include data dependencies, which identify data pre-requisites for data processing jobs. For example, a particular data processing job may require, as input, a set of log files, and the availability of the set of log files may depend on a third party. By using the job dependency map during the monitoring of the process execution platform, the process management platform may be provided with situational awareness regarding which data processing jobs are nearing completion and which data processing jobs can be expected to have dependencies satisfied by currently executing data processing jobs. In some implementations, the job dependency map may be used by the process management system for scheduling data processing jobs (e.g., to assign data processing jobs to queues, determine a measure of priority for data processing jobs, and/or the like).

As shown by reference number 140, the process management platform may cause execution of data processing jobs. In some implementations, as shown by reference number 145, the process management platform may provide, to the process execution platform, data that causes execution of the data processing jobs. In this situation, the process management platform may obtain job data from a data structure (e.g., obtain job data from a priority queue, the job data being associated with the data processing job having a highest measure of priority relative to priorities of other data processing jobs for which job data is stored in the priority queue) and provide the job data to the process execution platform in a manner designed to have the process execution platform perform the data processing job. Various execution implementations (e.g., various combinations of hardware and software, application programming interfaces (APIs), communications protocols, and/or the like) may be used to perform the data processing job. The output from the queueing system may be configured in a manner designed to work with any execution implementation, enabling a variety of different execution platform implementations to be used.

In some implementations, the process management platform manages the assignment of virtual hardware resources for the process execution platform. For example, the process management platform may monitor virtual hardware resources to determine when virtual hardware resource become available. In this situation, the process management platform may assign a particular data processing job to a particular virtual hardware resource. The manner in which data processing job execution begins may depend on the virtualization application(s) involved, the requirements of the data processing job, and/or the like. Various protocols and applications may be used, and process management platform may format the job data that causes one or more virtual hardware resources to perform a data processing job in any format appropriate for the corresponding protocols and/or applications.

After causing execution of a data processing job, the process management platform may monitor the data processing job and/or the virtual hardware resources used to execute the data processing job (e.g., in a manner similar to the monitoring described above) to determine when the data processing job is complete and the virtual hardware resources may be freed for use in another data processing job. In this way, the process management platform may facilitate the management and execution of a variety of data processing jobs on behalf of an entity.

In some implementations, the process management platform may perform one or more actions, in addition to or alternatively to those provided above, in a manner designed facilitate the performance of data processing jobs on behalf of an entity. For example, the process management platform may provide one or more devices with a variety of information regarding the performance of data processing jobs and/or the monitoring of virtual hardware resources, such as providing a request for additional virtual hardware resources in a situation where more virtual hardware resources may facilitate performing the data processing jobs within the time constraints specified by job timing data, providing a user device with a notification regarding completion of a data processing job associated with the user device, and/or the like. As another example, the process management platform may log statistics and other data regarding data processing job execution, e.g., in a manner designed to enable the performance of analytics, which may facilitate obtaining accurate information regarding the resources, time, and/or costs associated with performance of particular data processing jobs. The process management platform may also update one or more job profiles (e.g., by adding or changing a job profile based on analytics results, user input, and/or the like) or the job dependency map (e.g., by adding or removing dependencies, as appropriate for new and/or changing data processing jobs).

While a variety of example actions are described above as being performed by the process management platform, other actions may also be taken by the process management platform in a manner designed to facilitate the management of data processing jobs in a virtual computing environment. In this way, the process management platform enables an entity (e.g., an entity in control of the process management platform) to manage the manner in which data processing jobs are scheduled and executed by a virtual computing environment. For example, an organization that uses virtual computing resources for performing data processing jobs may use the process management platform in a manner designed to ensure that permissions associated with various jobs are being enforced, dependencies between data processing jobs and/or virtual computing resources are being satisfied, data processing jobs are being completed on time, virtual computing environment resources are being efficiently used, and/or the like.

In some implementations, the process management platform may provide a user interface enabling a job requests to be submitted by a large variety of users that might not otherwise be capable of submitting job requests. Using the process management platform may also result in significant conservation of computing resources, such as the computing resources used by users to submit job requests and computing resources used by the virtual computing environment to perform the data processing jobs. For example, computing resources used to submit jobs may be conserved by providing a user interface for guiding input for job requests (e.g., reducing erroneous or otherwise improper job requests) and by performing validation (e.g., to reduce time and/or computational resources that might otherwise be used to validate data processing jobs). Computing resources used by the virtual computing environment may be conserved by using data processing job priority, job dependency information, and/or other information, in a manner designed to schedule data processing job execution efficiently, minimizing unnecessary downtime, data storage, spooling, dependency locks, and/or the like. In addition, various implementations of the process management platform and the process execution platform may provide for high availability in the event of a failure, e.g., by enabling multiple devices to perform the actions described above, and enabling fail over in a manner designed to allow active devices to take over in a situation where one or more devices fail.

As indicated above, FIG. 1 is provided merely as an example. Other examples are possible and may differ from what was described with regard to FIG. 1.

Figure 2:
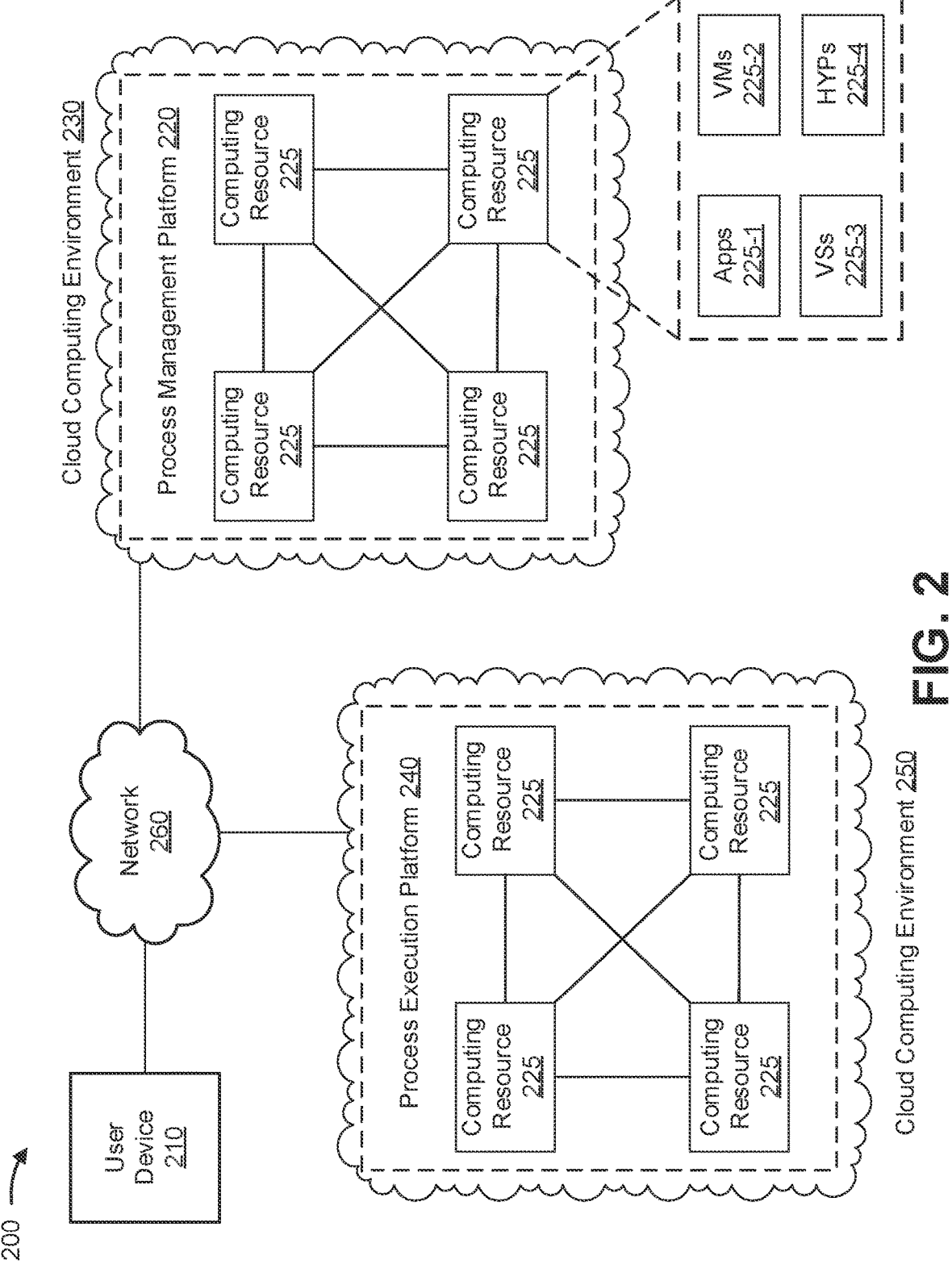
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, process management platform 220, computing resources 225, cloud computing environment 230, process execution platform 240, cloud computing environment 250, and a network 260. Devices of environment 200 may interconnect via wired connections, wireless connections, or a combination of wired and wireless connections.

User device 210 includes one or more devices capable of receiving, generating, storing, processing, and/or providing information associated with data processing jobs. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server device (e.g., a host server, a web server, an application server, etc.), a data center device, or a similar type of device. User device 210 may include hardware, or a combination of hardware and software, that enables user device 210 to communicate with process management platform 220 regarding job requests and data processing jobs. For example, user device 210 may include a web browser application designed to enable user device 210 to view a user interface provided by process management platform 220 for facilitating the submission of job requests associated with data processing jobs.

Process management platform 220 includes one or more devices capable of receiving, generating, storing, processing, and/or providing information associated with managing data processing jobs. For example, process management platform 220 may include a server device (e.g., a host server, a web server, an application server, etc.), a data center device, or a similar device. For example, process management platform 220 may be capable of receiving job requests from user devices 210, scheduling data processing jobs based on the received job request, and causing execution of the data processing jobs using process execution platform 240.

In some implementations, as shown, process management platform 220 may be hosted in cloud computing environment 230. Notably, while implementations described herein describe process management platform 220 as being hosted in cloud computing environment 230, in some implementations, process management platform 220 might not be cloud-based (i.e., may be implemented outside of a cloud computing environment) or might be partially cloud-based.

Cloud computing environment 230 includes an environment that delivers computing as a service, whereby shared resources, services, etc. may be provided to process management platform 220, e.g., to facilitate management of data processing jobs in a virtual environment. Cloud computing environment 230 may provide computation, software, data access, storage, and/or other services that do not require end-user knowledge of a physical location and configuration of a system and/or a device that delivers the services. As shown, cloud computing environment 230 may include process management platform 220 and computing resources 225.

Computing resource 225 includes one or more personal computers, workstation computers, server devices, or another type of computation and/or communication device. In some implementations, computing resource 225 may host process management platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with process management platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Process execution platform 240 includes one or more devices capable of receiving, generating, storing, processing, and/or providing information associated with data processing jobs. For example, process execution platform 240 may include a server device (e.g., a host server, a web server, an application server, etc.), a data center device, or a similar device. For example, process execution platform 240 may be capable of receiving job data from process management platform 220 and using the job data to direct virtual hardware to perform a data processing job specified by the job data.

In some implementations, as shown, process execution platform 240 may be hosted in cloud computing environment 250. Notably, while implementations described herein describe process execution platform 240 as being hosted in cloud computing environment 250, in some implementations, process execution platform 240 might not be cloud-based (i.e., may be implemented outside of a cloud computing environment) or might be partially cloud-based. In some implementations, cloud computing environment 250 may include, or be included in, cloud computing environment 230. For example, process management platform 220 and process execution platform 240 may be hosted in a single cloud computing environment (e.g., on the same or different computing resources 225).

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices, cloud computing environments, and network shown in FIG. 2 are provided as an example. In practice, there may be additional devices, fewer devices, different devices, or differently arranged devices than those shown in FIG. 2. Furthermore, two or more devices or cloud computing environments shown in FIG. 2 may be implemented within a single device or cloud computing environment, or a single device or cloud computing environment shown in FIG. 2 may be implemented as multiple, distributed devices or cloud computing environments. Additionally, or alternatively, a set of devices (e.g., one or more devices) or cloud computing environments of environment 200 may perform one or more functions described as being performed by another set of devices or cloud computing environments of environment 200.

Figure 3:
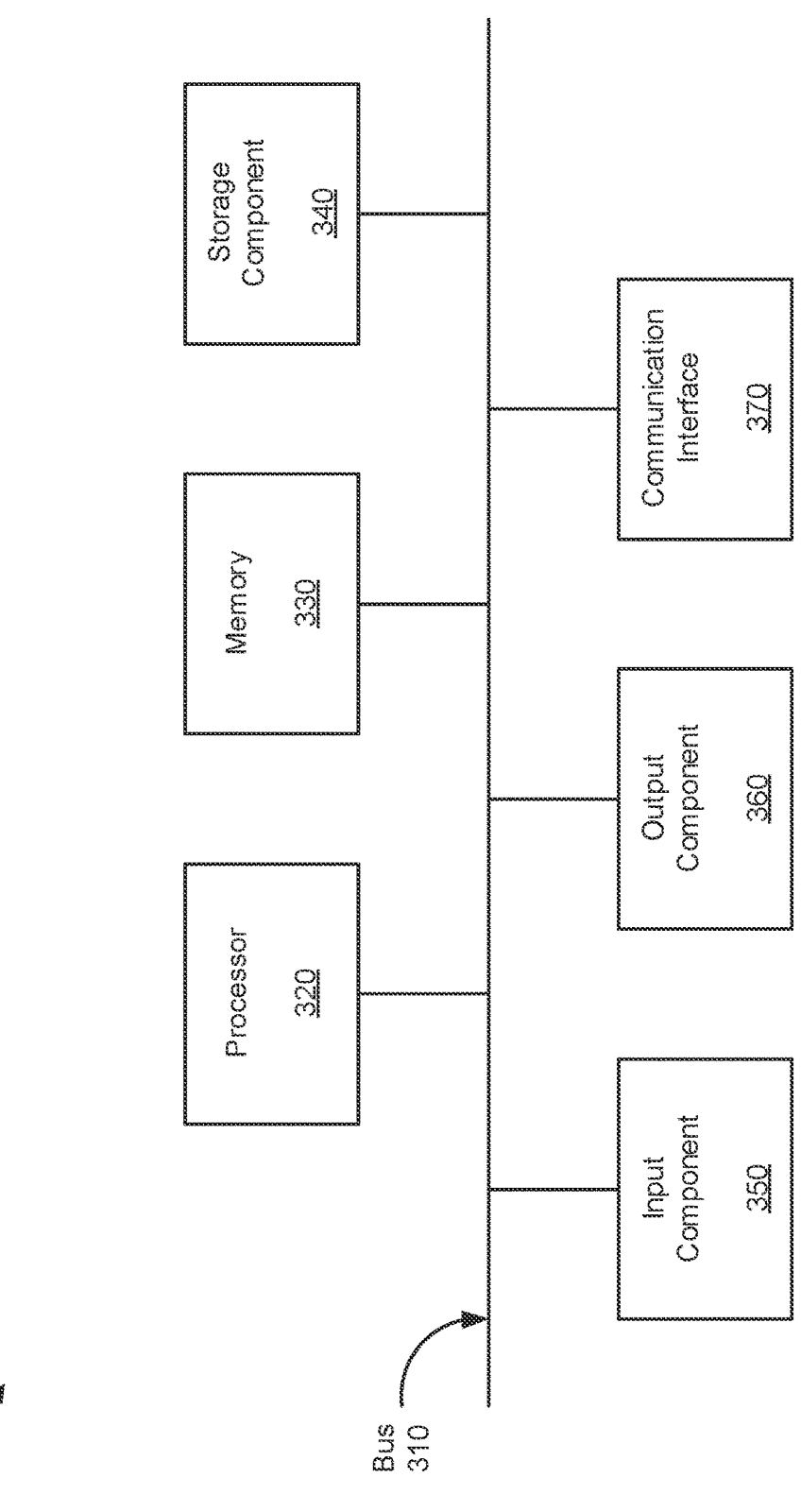
FIG. 3 is a diagram of example components of one or more devices of FIG. 2.

FIG. 3 is a diagram of example components of a device 300. Device 300 may correspond to user device 210, process management platform 220, computing resource 225, and/or process execution platform 240. In some implementations, user device 210, process management platform 220, computing resource 225, and/or process execution platform 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing execution of data processing jobs in a virtual computing environment. In some implementations, one or more process blocks of FIG. 4 may be performed by process management platform 220. In some implementations, one or more process blocks of FIG. 4 may be performed by another device or a group of devices separate from or including process management platform 220, such as user device 210, and/or process execution platform 240.

As shown in FIG. 4, process 400 may include receiving a job request associated with a data processing job (block 410). For example, process management platform 220 (e.g., using processor 320, input component 350, and/or communications interface 370) may receive, from user device 210, a job request associated with a data processing job, the job request including job timing data specifying a time at which the data processing job is to be executed by a virtual computing environment, as described above in connection with FIG. 1.

As further shown in FIG. 4, process 400 may include receiving user data identifying a user associated with the job request (block 420). For example, process management platform 220 (e.g., using processor 320, input component 350, and/or communications interface 370) may receive, from user device 210, user data identifying a user associated with the job request, as described above in connection with FIG. 1.

As further shown in FIG. 4, process 400 may include validating the data processing job based on the user data (block 430). For example, process management platform 220 (e.g., using processor 320, memory 330, storage component 340, output component 360, and/or communications interface 370) may validate the data processing job based on the user data, as described above in connection with FIG. 1.

As further shown in FIG. 4, process 400 may include identifying a priority associated with the data processing job (block 440). For example, process management platform 220 (e.g., using processor 320, memory 330, storage component 340, output component 360, and/or communications interface 370) may identify a priority associated with the data processing job, the priority being based on the user data and the job timing data, as described above in connection with FIG. 1.

As further shown in FIG. 4, process 400 may include providing, to a job queue, job data that corresponds to the data processing job (block 450). For example, process management platform 220 (e.g., using processor 320, memory 330, storage component 340, output component 360, and/or communications interface 370) may provide, to a job queue of a plurality of job queues, job data that corresponds to the data processing job, as described above in connection with FIG. 1.

As further shown in FIG. 4, process 400 may include monitoring the virtual computing environment to determine when virtual computing resources are available to perform jobs (block 460). For example, process management platform 220 (e.g., using processor 320, memory 330, storage component 340, output component 360, and/or communications interface 370) may monitor the virtual computing environment to determine when virtual computing resources are available to perform jobs, as described above in connection with FIG. 1.

As further shown in FIG. 4, process 400 may include determining that a virtual computing resource is available to perform the data processing job (block 470). For example, process management platform 220 (e.g., using processor 320, memory 330, storage component 340, output component 360, and/or communications interface 370) may determine, based on the monitoring, that a virtual computing resource included in the virtual computing environment is available to perform the data processing job, as described above in connection with FIG. 1.

As further shown in FIG. 4, process 400 may include providing the virtual computing resource with data that causes execution of the data processing job (block 480). For example, process management platform 220 (e.g., using processor 320, memory 330, storage component 340, output component 360, and/or communications interface 370) may provide, based on the determination that the virtual computing resource is available and based on the priority associated with the data processing job, the virtual computing resource with data that causes execution of the data processing job, as described above in connection with FIG. 1.

Process 400 may include additional implementations, such as any single implementation or any combination of implementations described below.

In some implementations, process 400 may include determining, by process management platform 220, that the data processing job is complete and identifying the virtual computing resource as available based on the determination that the data processing job is complete.

In some implementations, process 400 may include obtaining, by process management platform 220, a job map that specifies, for each of a plurality of data processing jobs, job dependencies, and determining that the data processing job is ready for execution based on the job map. In some implementations, the data processing job has at least one dependency specified by the job map. In some implementations, providing the virtual computing resource with data that causes execution of the data processing job includes providing the virtual computing resource with data that causes execution of the data processing job based on the determination that the data processing job is ready for execution.

In some implementations, process 400 may include obtaining, by process management platform 220, a job profile associated with the data processing job. The job profile may specify, for the data processing job: job resources to be used to execute the data processing job, job permissions specifying user identifiers permitted to cause execution of the data processing job, a measure of job priority associated with the data processing job, and a set of job dependencies that identifies data requirements associated with the data processing job and a plurality of other data processing jobs to be completed prior to execution of the data processing job. In some implementations, validating the data processing job based on the user data includes determining that the user data is associated with a user identifier specified by the job permissions specified by the job profile.

In this way, process management platform 220 enables an entity (e.g., an entity in control of process management platform 220) to manage the manner in which data processing jobs are scheduled and executed by a virtual computing environment. For example, an organization that uses virtual computing resources for performing data processing jobs may use process management platform 220 in a manner designed to ensure that permissions associated with various jobs are being enforced, dependencies between data processing jobs and/or virtual computing resources are being satisfied, data processing jobs are being completed on time, virtual computing environment resources are being efficiently used, and/or the like. In some implementations, process management platform 220 may provide a user interface enabling job requests to be submitted by a large variety of users that might not otherwise be capable of submitting job requests. Using process management platform 220 may also result in significant conservation of computing resources, such as the computing resources used by users to submit job requests and computing resources used by the virtual computing environment to perform the data processing jobs. For example, computing resources used to submit jobs may be conserved by providing a user interface for guiding input for job requests (e.g., reducing erroneous or otherwise improper job requests) and by performing validation (e.g., to reduce time and/or computational resources that might otherwise be used to validate data processing jobs). Computing resources used by the virtual computing environment may be conserved by using data processing job priority, job dependency information, and/or other information, in a manner designed to schedule data processing job execution efficiently, minimizing unnecessary downtime, data storage, spooling, dependency locks, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
determining, by a device, a first data processing job based on job timing data and based on at least one first job dependency, of a first set of job dependencies;
determining, by the device and based on determining that the first data processing job is incapable of being completed by a requested completion time, a suggested time by which the first data processing job is to be completed,
wherein the suggested time is different from the requested completion time;
providing, by the device, data that causes execution of the first data processing job according to the suggested time;
validating, by the device, a second data processing job based on second job timing data and based on at least one second job dependency of a second set of job dependencies, wherein the validation of the second data processing job includes:
determining whether the second data processing job is capable of being completed by the second job timing data; and
determining whether a third data processing job is capable of being completed by the second job timing data,
wherein the third data processing job is determined based on a second job dependency;
assigning, by the device and based on validating the second data processing job, the second data processing job to a priority queue, of multiple priority queues, based on the at least one second job dependency, wherein the priority queue is to be used for scheduling data processing jobs with job dependencies, and
wherein the multiple priority queues include at least one other priority queue that is to be used for scheduling data processing jobs without job dependencies;
causing, by the device and based on the priority queue, execution of the second data processing job in a virtual computing environment; and
managing, by the device, assignment of virtual hardware resources, of the virtual computing environment, for the execution of the second data processing job.

2. The method of claim 1, wherein the first set of job dependencies are associated with one or more of:
one or more other jobs associated with the first data processing job,
a maximum cost associated with the first data processing job, or
input data associated with the first data processing job.

3. The method of claim 1, wherein validating the second data processing job is further based on a format of the second data processing job.

4. The method of claim 1, wherein validating the second data processing job comprises:
determining whether a user associated with the second data processing job is validated based on a user identifier associated with the second data processing job.

5. The method of claim 1, wherein the priority queue includes a priority rank value that ranks a priority of jobs, and
wherein the priority rank is determined based on a job dependency.

6. The method of claim 1, wherein assigning the second data processing job to the priority queue is based on calculating a measure of priority based on characteristics associated with the second data processing job.

7. The method of claim 6, wherein the characteristics associated with the second data processing job include one or more of:
a time associated with when the second data processing job is to be executed or finished, or
data availability dependencies associated with the second data processing job.

8. A device, comprising:
one or more memories; and
one or more processors, coupled to the one or more memories, configured to:
determine a first data processing job based on job timing data and based on at least one first job dependency, of a first set of job dependencies;
determine, based on determining that the first data processing job is incapable of being completed by a requested completion time, a suggested time by which the first data processing job is to be completed,
wherein the suggested time is different from the requested completion time;
provide data that causes execution of the first data processing job according to the suggested time;
validate a second data processing job based on second job timing data and based on at least one second job dependency of a second set of job dependencies, wherein the validation of the second data processing job includes:
determining whether the second data processing job is capable of being completed by the second job timing data; and determining whether a third data processing job is capable of being completed by the second job timing data, wherein the third data processing job is determined based on a second job dependency;

assign, based on validating the second data processing job, the second data processing job to a priority queue, of multiple priority queues, based on the at least one second job dependency, wherein the priority queue is to be used for scheduling data processing jobs with job dependencies, and wherein the multiple priority queues include at least one other priority queue that is to be used for scheduling data processing jobs without job dependencies;

cause, based on the priority queue, execution of the second data processing job in a virtual computing environment; and manage assignment of virtual hardware resources, of the virtual computing environment, for the execution of the second data processing job.

9. The device of claim 8, wherein the second set of job dependencies are associated with one or more of:

one or more other jobs associated with the second data processing job, a maximum cost associated with the second data processing job, or input data associated with the second data processing job.

10. The device of claim 8, wherein validating the second data processing job is further based on a user associated with the second data processing job.

11. The device of claim 8, wherein the one or more processors, to assign the second data processing job to the priority queue, are configured to:

assign the second data processing job to the priority queue based on a default measure of priority.

12. The device of claim 8, wherein the one or more processors are further configured to:

monitor virtual computing resources used to perform the second data processing job.

13. The device of claim 8, wherein the one or more processors, to manage the assignment of the virtual hardware resources, are configured to:

assign the second data processing job to a particular virtual hardware resource.

14. The device of claim 8, wherein the one or more processors are further configured to:

determine when the second data processing job is complete.

15. A non-transitory computer-readable medium storing a set of instructions, the set of instructions comprising:

one or more instructions that, when executed by one or more processors of a device, cause the device to:

determine a first data processing job based on job timing data and based on at least one first job dependency, of a first set of job dependencies;

determine, based on determining that the first data processing job is incapable of being completed by a requested completion time, a suggested time by which the first data processing job is to be completed, wherein the suggested time is different from the requested completion time;

provide data that causes execution of the first data processing job according to the suggested time;

validate a second data processing job based on second job timing data and based on at least one second job dependency of a second set of job dependencies, wherein the validation of the second data processing job includes:

determining whether the second data processing job is capable of being completed by the second job timing data; and determining whether a third data processing job is capable of being completed by the second job timing data, wherein the third data processing job is determined based on a second job dependency;

assign, based on validating the second data processing job, the second data processing job to a priority queue, of multiple priority queues, based on the at least one second job dependency, wherein the priority queue is to be used for scheduling data processing jobs with job dependencies, and wherein the multiple priority queues include at least one other priority queue that is to be used for scheduling data processing jobs without job dependencies;

cause, based on the priority queue, execution of the second data processing job in a virtual computing environment; and manage assignment of virtual hardware resources, of the virtual computing environment, for the execution of the second data processing job.

16. The non-transitory computer-readable medium of claim 15, wherein the one or more instructions, that cause the device to assign the second data processing job to the priority queue, cause the one or more processors to:

assign the second data processing job to the priority queue based on an amount of time job data for the second data processing job has been stored in a queue.

17. The non-transitory computer-readable medium of claim 15, wherein the one or more instructions, that cause the device to assign the second data processing job to the priority queue, cause the one or more processors to:

assign the second data processing job to the priority queue based on priority, wherein the priority specifies an amount of resource usage.

18. The non-transitory computer-readable medium of claim 15, wherein the one or more instructions further cause the device to:

monitor, using a job dependency map, virtual computing resources used to perform the second data processing job.

19. The non-transitory computer-readable medium of claim 18, wherein the job dependency map includes a data structure that includes data defining dependencies, including the second set of dependencies, associated with the data processing jobs with job dependencies.

20. The non-transitory computer-readable medium of claim 15, wherein the one or more instructions further cause the device to:

provide information regarding performance of the second data processing job, provide a notification regarding completion of the second data processing job, or log statistics associated with the execution of the second data processing job.

* * * * *